United States Patent
Pettigrew et al.

(10) Patent No.: US 7,353,257 B2
(45) Date of Patent: Apr. 1, 2008

(54) SYSTEM AND METHOD FOR DISASTER RECOVERY AND MANAGEMENT OF AN EMAIL SYSTEM

(75) Inventors: Nancy Pettigrew, Lomita, CA (US); Charles McColgan, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 10/994,010

(22) Filed: Nov. 19, 2004

(65) Prior Publication Data

US 2006/0112166 A1    May 25, 2006

(51) Int. Cl.
*G06F 15/16* (2006.01)
*G06F 15/173* (2006.01)

(52) U.S. Cl. .................. 709/206; 709/224; 709/226
(58) Field of Classification Search ................. 709/206
See application file for complete search history.

(56) References Cited

U.S. PATENT DOCUMENTS

| | | | | |
|---|---|---|---|---|
| 5,915,004 | A * | 6/1999 | Pabbati et al. | 379/100.08 |
| 5,999,932 | A * | 12/1999 | Paul | 707/10 |
| 6,185,604 | B1 * | 2/2001 | Sekiguchi | 709/206 |
| 6,393,387 | B1 * | 5/2002 | Adriaans et al. | 703/27 |
| 6,799,148 | B2 * | 9/2004 | Ling et al. | 702/188 |
| 2001/0032245 | A1 * | 10/2001 | Fodor | 709/206 |
| 2002/0122543 | A1 * | 9/2002 | Rowen | 379/93.01 |
| 2003/0233415 | A1 * | 12/2003 | Beyda | 709/206 |
| 2004/0049546 | A1 * | 3/2004 | Yoshida | 709/206 |
| 2004/0059787 | A1 * | 3/2004 | Kawaguchi et al. | 709/206 |
| 2004/0215724 | A1 * | 10/2004 | Smoot et al. | 709/206 |
| 2005/0010644 | A1 * | 1/2005 | Brown et al. | 709/206 |
| 2005/0033845 | A1 * | 2/2005 | Perepa et al. | 709/226 |
| 2005/0044150 | A1 * | 2/2005 | Kaminsky et al. | 709/206 |
| 2007/0088970 | A1 * | 4/2007 | Buxton et al. | 714/2 |

OTHER PUBLICATIONS

PCT International Search report for International Application No. PCT/US05/41899, mailing date Jun. 8, 2007, Authorized officer Jason D. Cardone.

* cited by examiner

*Primary Examiner*—Jason D Cardone
*Assistant Examiner*—Thomas Duong

(57) ABSTRACT

The present invention provides an improved system and method for disaster recovery and management of an email system. The system includes a deferral monitor that detects when a failure occurs in a client's email system, and a mailbox creation process and automatically creates mailbox accounts for the affected domains that queue incoming mail while the failure is repaired. This ensures no email is bounced because of the unavailable mail servers. Once the email servers are reconnected, the system forwards queued email to the client in a "flow-controlled" manner until all email is delivered. The system may further include a web mail interface that allows the client to maintain email functionality until the failure is repaired. The system may also include a message switch that filters all email for policy and content rules, spam and viruses before passing the email to the client.

32 Claims, 3 Drawing Sheets

SYSTEM AND METHOD FOR DISASTER RECOVERY AND MANAGEMENT OF AN EMAIL SYSTEM

FIELD OF THE INVENTION

The present invention generally relates to email systems and more particularly, to a system and method that detects failures in an email system and takes corrective measures, including providing an alternate email service so that a client maintains the ability to send and receive email until the original service is restarted.

BACKGROUND OF THE INVENTION

Enterprises increasingly rely on email as a core communication tool for connecting with business associates, partners, customers, and others. In most companies, employees send and receive more email messages than telephone calls. Email is a conduit for exchanging data, contracts, orders, legal documents, and other mission-critical communications. With reliance on email to sustain and improve business, a company's email infrastructure should offer the highest level of security and reliability. Ensuring the continued availability of this infrastructure is a sizeable task that presents a real challenge to many information technology organizations.

It would therefore be desirable to provide a system and method for disaster recovery and management of an email system that ensures that an enterprise will be able to continue to send and receive email messages, even if the enterprise's email servers are unavailable.

SUMMARY OF THE INVENTION

The present invention provides an improved system and method for disaster recovery and management of an e-mail system. The system and method detects when a failure occurs in a client's email system, and automatically creates mailbox accounts for the affected domains that queue incoming mail while the failure is repaired. The system may further include a web mail interface that allows the client to maintain email functionality until the failure is repaired. The system and method may further include a message switch that filters all email for policy and content rules, spam and viruses before passing the email to the client.

The invention may be implemented using a highly reliable distributed network including multiple data centers that provide a persistent and steadfast conduit for inbound email for clients. The system may use a deferral monitor to detect when a client's email servers or Internet connection is down. A related process may examine deferrals and create mailbox accounts as needed. The inbound email will be queued in the user mailbox accounts until the client's mail servers are restored and available for inbound mail traffic. This ensures no email is bounced because of the unavailable mail servers. Once the email servers are reconnected, a transfer process may be activated that causes the mailbox accounts to "release" or forward queued email to the client in a "flow-controlled" manner until all email is delivered.

One advantage of the invention is that it ensures that email messages directed to a client will not be bounced or lost even if the client's email servers are unavailable.

Another advantage of the invention is that it provides a system and method for disaster recovery of an email system that seamlessly queues all incoming mail while a failure is repaired without any action required by the client. The system may include a web mail interface for allowing users to access the queued email and allowing the client to maintain email functionality until the failure is repaired.

Another advantage of the invention is that it provides for policy, content, spam and virus filtering of email using the clients preferred settings, even in the event of a failure of a client email system.

According to one aspect of the present invention, a system is provided for disaster recovery of a client email system having a one or more user accounts. The system includes one or more servers that receive and transfer email for the client email system; a deferral monitor that detects failure of the client email system; and a mailbox creation process that, in response to a failure, automatically creates one or more mailboxes corresponding to the one or more user accounts, wherein email directed to the client email system is routed to the one or more mailboxes.

According to another aspect of the present invention, a system is provided for disaster recovery and management of a client email system having a plurality of user accounts. The system includes a plurality of distributed servers that receive and process email messages transferred to the client email system, the servers including one or more queues for temporarily storing email prior to transferring the email to the client email system; a deferral monitor that detects failure of the client email system by determining when queuing of email in the servers exceeds a threshold value; and a mailbox creation process that, in response to a failure, automatically creates a plurality of mailboxes corresponding to the plurality of user accounts, wherein email directed to the client email system is routed to the plurality of mailboxes.

According to another aspect of the present invention, a method is provided for disaster recovery and management of a client email system having a plurality of user accounts. The method includes routing email messages to one or more servers that receive, process and transfer email messages directed to the client email system; detecting a failure of the client email system; automatically creating a plurality of mailboxes corresponding to the plurality of user accounts, in response to detecting a failure in the client email system; and routing email messages directed to the client email system to the one or more mailboxes until the failure is repaired.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention can be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
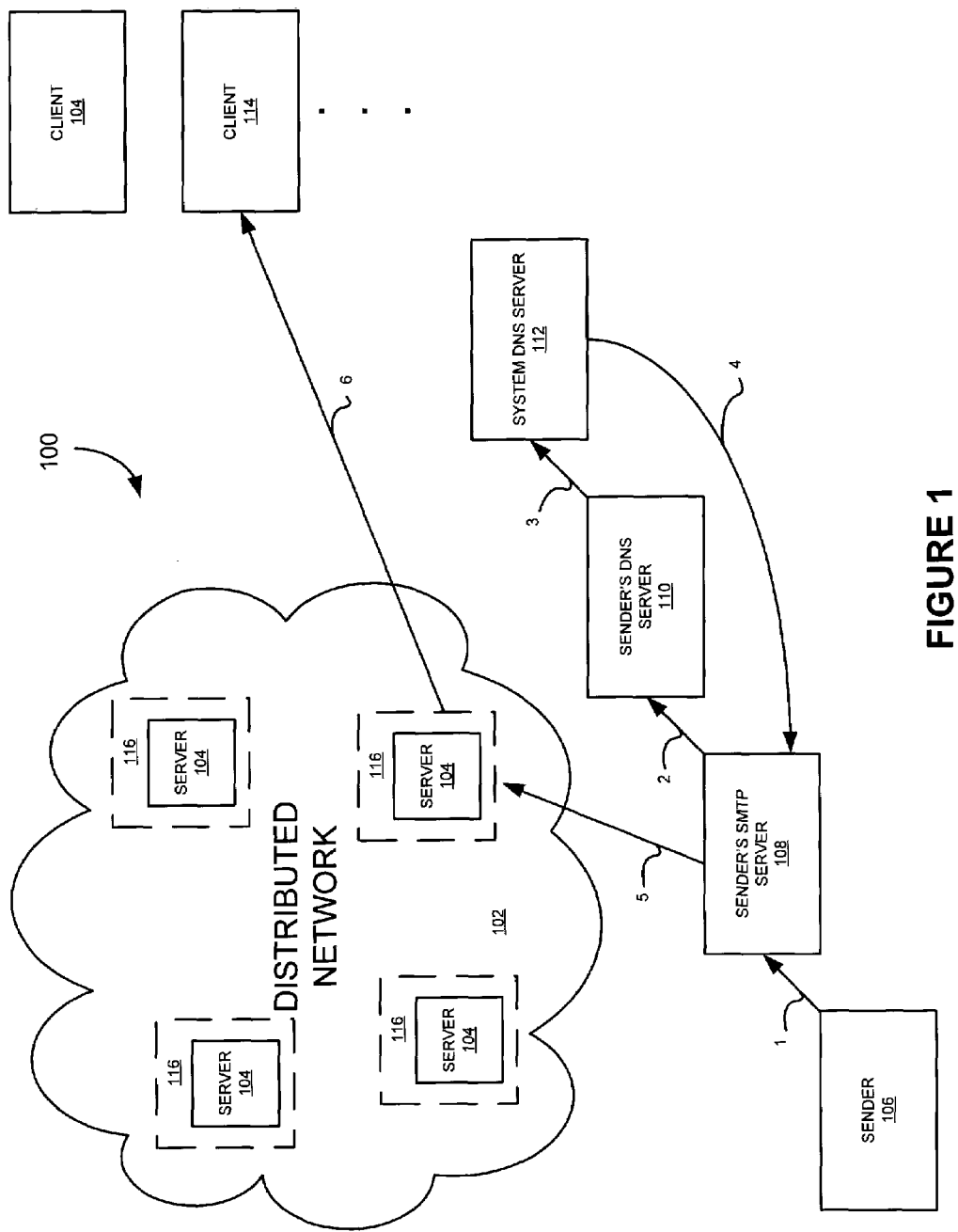
FIG. 1 is a schematic diagram illustrating a system for disaster recovery and management of an email system, according to the present invention, which is implemented over a distributed network.

In one embodiment, the system 100 may be implemented over a distributed network. FIG. 1 illustrates the system 100 implemented over a distributed network 102. The distributed network 102 includes multiple conventional servers 104, which are communicatively interconnected. Several remote and secure data centers 116 house servers 104. The data centers 116 are physically constructed to withstand substantial meteorological and geological events, and include state of the art security measures, climate control systems, built-in redundancies and back-up generators to ensure high availability and reliability. The data centers 116 are preferably dispersed in remote locations throughout a geographic coverage region. A system operator may control operation of the system 100, and signup multiple remotely located customers or "clients" 114 that may be recipients of e-mail. The clients 114 may be remotely located from each other and unrelated. Each different customer or client 114 may represent one or more computer systems or an enterprise system, including multiple servers. Any e-mail directed to or from clients 114 will pass through system 100. In order to route all e-mail through system 100, each client 114 changes its mail exchanger or "MX" record to reflect the IP address of a conventional DNS server 112 for the system. In this manner, all mail directed to the clients 114 will reach the DNS server 112 for system 100 and be passed through the system 100 prior to reaching clients 114. This process is best shown by a description of steps (1)-(6) depicted in FIG. 1.

When a sender 106 transmits an e-mail message addressed to a client 114, the email passes through system 100 as follows. In step (1), the message passes to a conventional Simple Mail Transfer Protocol (SMTP) server 108 for the sender. In step (2), the SMTP server 108 communicates with a conventional DNS server 110 for the sender 106 to request the MX record for the client 114. In step (3), the sender's DNS server 110 makes a record request for the client's MX record, which is now associated with the system's DNS server 112. This request is thus passed to the system's DNS server 112. The system's DNS server 112 then selects the most appropriate data center 116 to service the e-mail. The system's DNS server 112 will select the most appropriate data center 116 based on one or more of the following criteria: (i) the "health" of the servers 104 within the data center 116 (e.g., whether the servers are functioning properly); (ii) the capacity of the servers 104 within the data center 116 (e.g., whether the servers 104 are operating above or below a threshold capacity); (iii) the projected roundtrip time between a remote data center and the intended client 114; and (iv) the geographical distance between the sender 106 and/or the senders DNS server 110 and the data center 116. Different weights can be assigned to the different criteria based on what would be suitable or desirable to a system operator under a given set of circumstances.

In step (4), the system's DNS server 112 responds to the sender's SMTP server 108 with an IP address corresponding to a server 104 in the selected data center 116. In step (5), the SMTP server 108 delivers the message to server 104. In one embodiment, server 104 includes and passes the message through a message processor or "switch", i.e., a software program for policy, content, spam and/or virus filtering. An instance of the message switch may be located and operating within each server 104. If the message switch determines that a message violates content, policy or spam rules or may contain a virus (as used herein the terms "virus" and "virus filter" should be broadly construed to cover any malicious or undesirable code such as viruses, Trojan horses, worms and the like), it may block, reject or quarantine the message. Assuming the message switch does not reject or quarantine the message, server 104 subsequently transmits the message to client 114, as shown in step (6).

The present system also provides for disaster recovery and management in the event of a failure at a client email system or site 114. If a failure is detected in the client's email system that would prevent delivery of email messages to the client, the system provides disaster recovery and management of the client's email system. Particularly, the system may queue incoming email and provide access to the email until the client's email system is restored. Once the client's email system is restored, the system will transfer the queued messages to the client in a flow controlled manner. The following discussion describes these disaster recovery and management functions.

Figure 2:
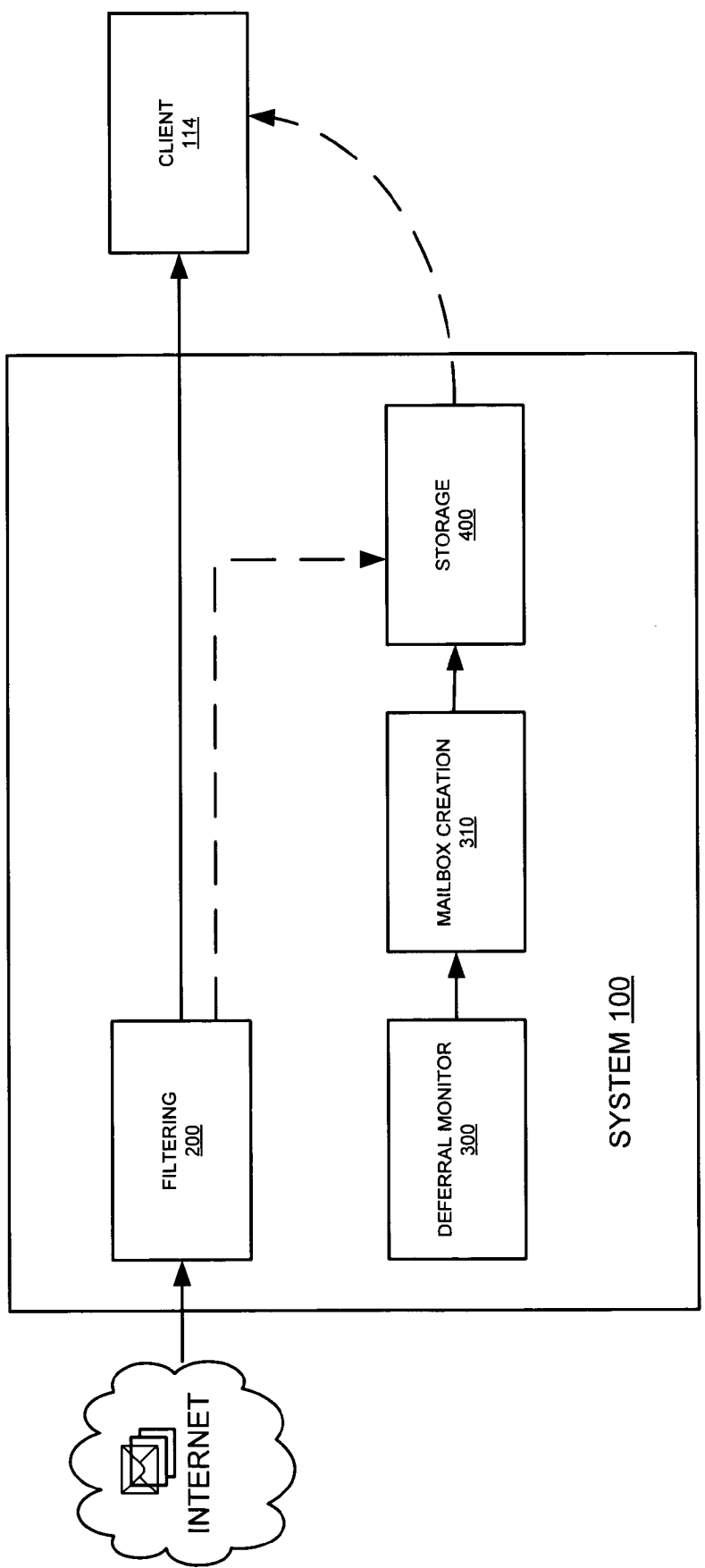
FIG. 2 is a block diagram illustrating the general functionality of a system for disaster recovery and management of an email system, according to the present invention.

FIG. 2 is a block diagram illustrating the general operation of the system 100. While the present invention will be primarily described in relation to a system 100, it should be appreciated that each of the portions or blocks illustrated in FIG. 2 (as well as the portions or blocks illustrated in the other Figures) may represent logic steps or processes and/or the hardware and/or software utilized to perform the logic steps or processes. It should further be appreciated that any one or more of the portions or blocks shown can be implemented in a computer readable medium as part of a system. Additionally, the blocks or processes shown in FIG. 2 may each include multiple processes that are distributed and/or reside on multiple servers 104 within a distributed computer system 102. As shown in FIG. 2, the system 100 may include a filtering process 200, a deferral monitor 300, a mailbox creation process 310, and a storage facility 400.

The filtering process 200 may include a message processor or "switch", i.e., a software program for policy, content, spam and/or virus filtering. An instance of the message switch may be preferably located and operating within each server 104. The message switch may include one or more programs (e.g., policy, content, spam and/or virus filtering programs). In one embodiment, the message switch is substantially similar to the message switch described in U.S. patent application Ser. No. 10/849,090, which is assigned to the present assignee and which is incorporated herein by reference. If the message switch determines that a message violates content, policy or spam rules or may contain a virus, it may block, reject or quarantine the message. Assuming the message switch does not reject or quarantine the message and no failures are detected in client system 114, the message passes to the intended recipient in client system 114. However, if the deferral monitor 300 has detected a failure in the client system 114, deferral monitor 300 triggers a disaster recovery sequence, and the message is passed to storage facility 400, as described below.

The deferral monitor 300 may include one or more processes that run on each mail server in the system (e.g., mail servers 104). The deferral monitor 300 examines the deferral queues on the system's mail servers 104 for excessive deferrals. In the presence of excessive deferrals, the deferral monitor 300 will trigger a mailbox creation process 310, which causes the client's affected email accounts to be recreated in storage facility 400. The client's mail is then routed to the mailboxes within storage facility 400. The threshold value for deferrals that the deferral monitor 300 will consider "excessive" may vary from client to client. For instance, each client may set a threshold value, such as a maximum quantity of deferrals, maximum length of time that deferrals can occur, or a rate threshold (e.g., maximum deferrals per time period), which if exceeded, will cause the deferral monitor 300 to trigger the mailbox creation process 310. In one embodiment, a client can dynamically set and adjust this threshold value. Alternatively, an administrator of system 100 can set and alter the threshold value (e.g., by way of a conventional administrative interface). The deferral reason may also be examined to determine if the client mail system is down completely, or just temporarily.

Storage facility 400 may include one or more conventional storage servers, processes and devices with redundancies. The storage facility 400 stores mail in user mailboxes that mimic the affected client domains. Once the client email system is restored, a transfer process is activated that passes the stored email messages from the storage facility 400 to the respective mailboxes on the client system. In one embodiment, the storage facility 400 is configured such that users cannot delete mail from their user mailbox accounts. In this manner, once the client email system is repaired, a correct and complete image of the client's email system can be restored.

Figure 3:
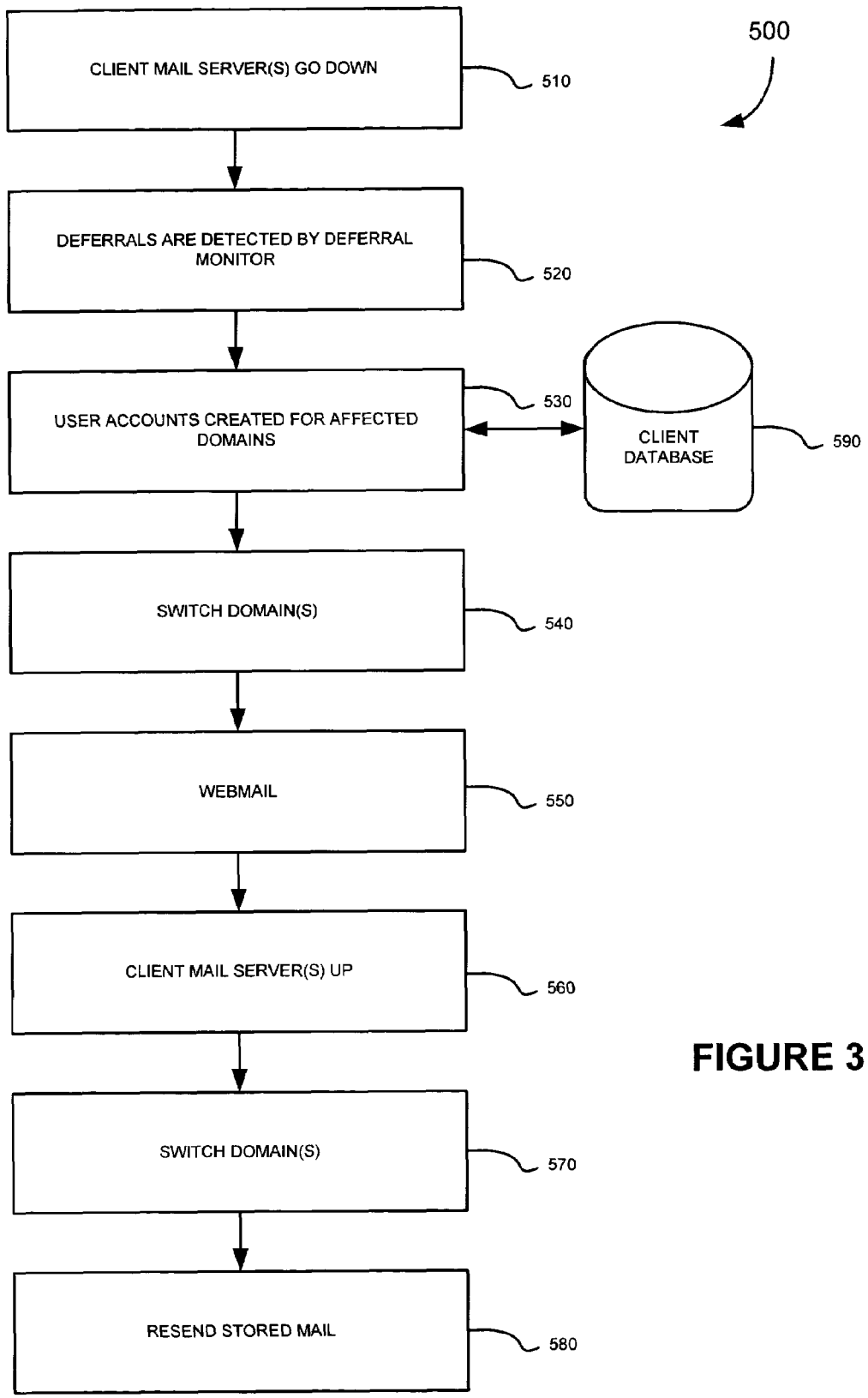
FIG. 3 is a flow diagram illustrating the operation of the system for disaster recovery and management of an email system, according to the present invention.

Operation of the system 100 will now be described with reference to FIG. 3, which illustrates one embodiment of a method 500 that may be performed for disaster recovery and management of an email system. Method 500 begins at block 510, where a disaster or failure occurs at a client site and causes the client's mail servers to be inaccessible and/or inoperative for a period of time. As a result of the client email system being unavailable, messages that were addressed to users in the client system begin to accumulate in the relay queues of the mail transfer agents (MTAs) of the system 100. In block 520, the deferral monitor 300 detects when the deferrals exceed a predetermined threshold (e.g., rate, length of time or quantity). As explained above, the predetermined threshold may vary client by client, and may be dynamically set and modified by each client. Once the deferral monitor 300 has determined that the threshold has been exceeded, the monitor 300 may notify the client and the system 100 that a potential failure or disaster has occurred. The deferral monitor 300 may also detect a failure by the client sending a message to the system 100 notifying the system or system administrator of the failure.

In block 530, the deferral monitor 300 triggers the mailbox account creation process 310 that automatically creates user accounts for the affected client domains. In one embodiment, the mailbox account creation process 310 runs on a central database server, which communicates with a client information database 590 that is maintained by system 100. The client database 590 may include information describing and identifying each of the user accounts affected by the disaster or failure in the client email system. The client database 590 may also include other information for processing mail for clients, such as client specific rules and settings to be applied during the filtering process 200, and client specific threshold values. Based on the account information contained in the database, the mailbox account creation process 310 creates temporary mailbox accounts in storage facility 400 corresponding to each of the affected client user accounts. In one embodiment, the client upon discovering a system failure may provide the affected user accounts. For instance, once a client is notified of a disaster or failure of its email system (e.g., through notification by system 100), it may transmit all of its user account information directly to the client database 590. Alternatively, the client may provide the information to a system administrator for entry into database. 590, or for manual creation or preparation of the mailbox accounts.

In block 540, the system switches the message delivery destination from the client gateway to the temporary mailbox accounts in storage facility 400. In this manner, all queued mail and new mail addressed to the client is delivered to the respective mailbox accounts in storage facility 400 rather than to the client's failed email system. In block 550, the system enables a web mail application that allows users to access the mailbox accounts through a conventional web interface. The web mail application may be a conventional web-based email application. In one embodiment, the web mail application is configured such that users are not allowed to delete messages contained in the storage facility 400. The web mail application may further be configured to save all outgoing messages sent by users. In this manner, once the client email system is repaired, a correct and complete image of the client's email system can be restored.

In block 560, the client mail servers are repaired. Once the client email system is repaired, notification is sent to system 100 (e.g., by the client system or administrator). Alternatively, deferral monitor 300 may periodically examine the client email system to detect when it is sufficiently repaired. This may be performed by periodically sending messages to the client email system to determine whether the client email system is accepting messages. In block 570, once the system 100 determines that the client email system is repaired, the process switches the active domain from the temporary mailbox accounts back to the client gateway. The process ends in block 580, where the transfer process redelivers mail stored in facility 400 to the client email system. In one embodiment, all stored messages that were sent through the web mail application are also delivered to the client email system for reference. In one embodiment, the email messages are delivered over to the client in a flow-controlled manner. The rate at which the messages are delivered may be set and adjusted on a client-by-client basis and stored within the client database 590.

In this manner, system 100 provides for management and recovery of a client email system. The system seamlessly queues all incoming mail while the failure is repaired without requiring any action by the client. The system may also include an interface that allows the client to maintain email functionality (e.g., both sending and receiving email) until the failure is repaired. The architecture and function of system 100 also ensure that the client's specific policy, content, spam and/or virus filtering procedures will continue uninterrupted and unaffected, even in the event of a failure of a client email system.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A system for disaster recovery of a client email system having a one or more user accounts, the system comprising:

one or more servers that receive and transfer email for the client email system;

a deferral monitor that detects failure of the client email system; and a mailbox creation process that, in response to a failure of the client email system, automatically creates one or more temporary mailboxes corresponding to the one or more user accounts, respectively, on the one or more servers, wherein email directed to the client email system is routed to the one or more mailboxes, wherein the created one or more mailboxes are accessible by the user accounts, respectively, during the failure of the client email system.

2. The system of claim 1 wherein the deferral monitor resides on the one or more servers.

3. The system of claim 2 wherein the one or more servers selectively queue email prior to transferring the email to the client email system, and wherein the deferral monitor detects failure of the client email system by determining when queuing of email in the servers exceeds a threshold value.

4. The system of claim 3 wherein the threshold value comprises a time value, a quantity value or a rate value, and wherein the threshold value is dynamically set and modified by each client email system.

5. The system of claim 1 wherein the deferral monitor detects failure of the client email system by receiving notification from the client email system.

6. The system of claim 3 wherein the deferral monitor is further adapted to detect when the client email system is repaired, and in response, to activate a transfer process that forwards any email in the one or more mailboxes to the client email system.

7. The system of claim 1 further comprising:

a web mail interface that allows users to access the one or more mailboxes.

8. The system of claim 7 wherein the web mail interface is configurable to prevent users from deleting messages in the one or more mailboxes.

9. The system of claim 8 wherein the web mail interface is configurable to store messages sent by users by use of the interface.

10. The system of claim 1 further comprising:

a message switch that is adapted to filter email messages according to one or more rules prior to transferring the email messages to the client email system or to the one or more mailboxes.

11. The system of claim 10 wherein the one or more rules include policy rules, content rules, spam rules or virus filtering rules.

12. The system of claim 1 further comprising:

a storage module for storing the one or more mailboxes.

13. A system for disaster recovery and management of a client email system having a plurality of user accounts, the system comprising:

a plurality of distributed servers that receive and process email messages transferred to the client email system, the servers including one or more queues for temporarily storing email prior to transferring the email to the client email system;

a deferral monitor that detects failure of the client email system by determining when queuing of email in the servers exceeds a threshold value; and a mailbox creation process that, in response to a failure, automatically creates a plurality of mailboxes corresponding to the plurality of user accounts, respectively, wherein email directed to the client email system is routed to the plurality of mailboxes, wherein the created plurality of mailboxes are accessible by plurality of user accounts, respectively, during the failure of the client email system.

14. The system of claim 13 further comprising:

a web mail interface for allowing users to selectively access the plurality of mailboxes.

15. The system of claim 14 wherein the web mail interface is configurable to prevent users from deleting messages in the one or more mailboxes.

16. The system of claim 15 wherein the web mail interface is configurable to store messages sent by users by use of the interface.

17. The system of claim 14 further comprising:

one or more filters for processing email messages prior to transferring the email messages to the client email system or to the one or more mailboxes.

18. The system of claim 17 wherein the one or more filters comprise a spam filter.

19. The system of claim 17 wherein the one or more filters comprise a content or policy filter.

20. The system of claim 17 wherein the one or more filters comprise a virus filter.

21. The system of claim 14 further comprising:

a storage facility for storing the one or more mailboxes.

22. A method for disaster recovery and management of a client email system having a plurality of user accounts, comprising:

routing email messages to one or more servers that receive, process and transfer email messages directed to the client email system;

detecting a failure of the client email system;

automatically creating a plurality of mailboxes corresponding to the plurality of user accounts, respectively, in response to detecting a failure in the client email system; and routing email messages directed to the client email system to the one or more mailboxes until the failure is repaired, wherein the created plurality of mailboxes are accessible by the respective user accounts, respectively, during the failure of the client email system.

23. The method of claim 22 further comprising:

detecting when the client email system is repaired; and forwarding any email in the one or more mailboxes to the client email system.

24. The method of claim 23 wherein the one or more servers include one or more queues for temporarily storing email messages prior to transferring the email messages to the client email system; and wherein detecting a failure of the client email system comprises determining when queuing of email in the servers exceeds a threshold value.

25. The method of claim 23 further comprising:

providing an interface for allowing users to selectively access the plurality of mailboxes.

26. The method of claim 25 wherein the interface is a web mail interface.

27. The method of claim 25 wherein the interface is configured such that the users cannot delete messages in the one or more mailboxes.

28. The method of claim 27 wherein the interface is configured to store messages sent by users by use of the interface.

29. The method of claim 22 further comprising:
  filtering the email messages prior to transferring the email messages to the client email system or to the one or more mailboxes.

30. The method of claim 29 wherein the filtering comprises content or policy filtering.

31. The method of claim 29 wherein the filtering comprises spam filtering.

32. The method of claim 29 wherein the filtering comprises virus filtering.

* * * * *